United States Patent [19]

Melvin

[11] Patent Number: 5,404,545

[45] Date of Patent: Apr. 4, 1995

[54] INTERFACE ISOLATION AND SELECTION CIRCUIT FOR A LOCAL AREA NETWORK

[75] Inventor: Bruce W. Melvin, Roseville, Calif.

[73] Assignee: Hewlett-Packard Company, Palo Alto, Calif.

[21] Appl. No.: 922,120

[22] Filed: Jul. 29, 1992

[51] Int. Cl.[6] .............................................. G06F 1/26
[52] U.S. Cl. ..................................... 395/750; 323/902; 307/140; 364/948.91; 364/DIG. 2
[58] Field of Search ..................... 395/750; 307/140; 363/92, 16; 323/267, 235

[56] References Cited

U.S. PATENT DOCUMENTS

| | | | |
|---|---|---|---|
| 4,276,591 | 6/1981 | Quick | 363/92 |
| 4,536,715 | 8/1985 | Basarath et al. | 330/2 |
| 4,641,233 | 2/1987 | Roy | 363/89 |
| 4,870,340 | 9/1989 | Kral | 323/235 |
| 4,933,825 | 6/1990 | Allington et al. | 363/16 |
| 4,965,710 | 10/1990 | Pelly et al. | 363/56 |
| 5,003,192 | 3/1991 | Beigel | 307/140 |
| 5,285,367 | 2/1994 | Keller | 363/21 |

Primary Examiner—Gopal C. Ray

[57] ABSTRACT

An improved interface isolation and selection circuit for a local area network. The invention includes a power supply effective to provide an isolated output voltage. An opto-isolator transforms a first control signal to a second control signal effective to activate the interface. The opto-isolator includes an optical emitter for providing an optical signal in response to the first control signal and an optical detector for receiving the optical signal and providing the second control signal in response thereto. The second control signal is effective to activate the interface by applying the isolated power thereto. In particular implementations, the isolated power and the power for the opto-isolator are provided by a single power supply and a field effect transistor is activated by the opto-isolator and, in turn, activates the interface.

7 Claims, 4 Drawing Sheets

INTERFACE ISOLATION AND SELECTION CIRCUIT FOR A LOCAL AREA NETWORK

BACKGROUND OF THE INVENTION

1. Field of the Invention

The present invention relates to local area networks. More specifically, the present invention relates to media access units (MAUs) used in local area networks.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Local area networks (LANs) facilitate data communication between computing systems. Currently, several types of LAN systems are used widely in the art. Most systems may be classified generally as either an Ethernet, Token Ring, or 10 Base T type local area network.

The Ethernet system is characterized by a coaxial cable which serves as a bus. The nodes of the system (e.g., terminals, printers and other devices) are connected to the cable and assigned a unique address.

A Token Ring LAN is a circular network similar to the Ethernet system with the exception that a token is used to control access to the network. The token is a packet of signals that is passed from node to node. The node that has the token has control of the network with respect to the transmission of data to and reception of data from other nodes. When the node has completed a transmission, the token is released for acquisition by another node.

The 10 Base T local area network is characterized by the use of a pair of twisted wires as a connector between nodes arranged in a star configuration around a controlling hub.

Each of these systems requires an interface between the node and the local area network (LAN). Certain systems include an internal dedicated interface and allow for the connection of an external interface as well. An Ethernet network device, for example, may have an Attachment Unit Interface (AUI) for external interfacing and an internal dedicated Medium Attachment Unit (MAU) electrically connected to the same LAN controller. Hence, there has been a need for a means by which either the MAU or AUI is mutually exclusively enabled.

Standards have been developed for certain LAN interfaces. For example, for an Ethernet like network, a standard has been set by the IEEE (Institute of Electrical and Electronic Engineers) with respect to certain physical and electrical characteristics of the MAU (see Section 8.3.2.1 of the IEEE 802.3 standard). In general, the constraints imposed by the standard dictate that the interface provide electrical isolation of the physical media from the node device circuitry.

The electrical connection made to the LAN controller by both the AUI and the dedicated internal MAU is made in the form of three or four wire pairs that are passed through an isolation network, usually a transformer, to provide isolation as dictated by the IEEE standard.

Since the LAN interface is electrically isolated from the LAN controller, a mechanism was required by which the controller could configure the LAN port such that the dedicated or internal interface was selectively enabled or disabled. Selective enablement of a dedicated or internal interface is required when an optional AUI connector port is provided, otherwise, the signal pairs from either may electrically contend if both interfaces were inadvertently used.

The conventional technique for enabling/disabling and isolating the interface from the node circuitry involved the use of a DC to DC converter. A DC to DC converter is a device that converts a DC (direct current) signal at one level to a second DC signal at a second level. This device converts power delivered to and used by the LAN controller to power that is electrically isolated and of the correct voltage and current required for operation of the interface. The converter, and hence the interface, is enabled and disabled by switching power on or off to the primary side of the DC-to-DC converter.

Unfortunately, DC to DC converters are costly, unreliable, consume much power and occupy much space on the printed circuit board of the unit and introduce undesirable radio frequency and electrical noise.

Thus, a need remains in the art for an inexpensive, reliable technique for isolating power supplied to a LAN interface in accordance with the IEEE standard which does not consume much power or space nor generate undesirable noise.

SUMMARY OF THE INVENTION

The need in the art is addressed by the present invention which provides an improved interface isolation and selection circuit for a local area network. The invention includes a power supply effective to provide an isolated output voltage. An opto-isolator transforms a first control signal to a second control signal effective to activate the interface. The opto-isolator includes an optical emitter for providing an optical signal in response to the first control signal and an optical detector for receiving the optical signal and providing the second control signal in response thereto. The second control signal is effective to activate the interface by applying the isolated power thereto.

In particular implementations, the isolated power is provided by a single power supply and a field effect transistor is activated by the opto-isolator and, in turn, activates the interface.

DESCRIPTION OF THE INVENTION

Illustrative embodiments and exemplary applications will now be described with reference to the accompanying drawings to disclose the advantageous teachings of the present invention.

Figure 1:
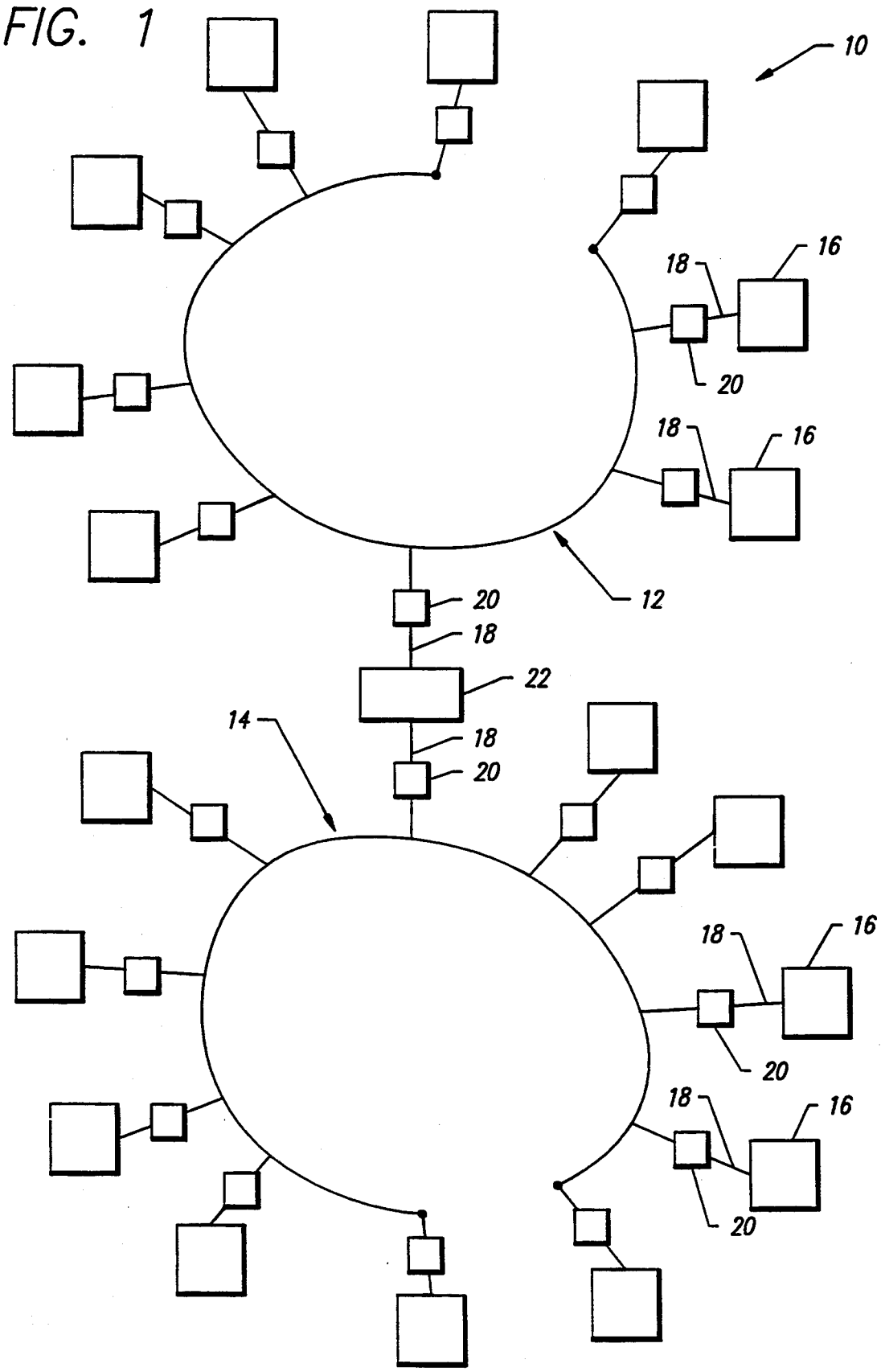
FIG. 1 is a diagram illustrating a typical local area network showing a plurality of nodes and interfacing units.

FIG. 1 is a diagram illustrating a typical local area network 10. The network 10 includes a first subnetwork 12 and a second subnetwork 14. Each subnetwork includes a plurality of nodes 16 which are connected to the first subnetwork 12 or the second subnetwork 14 by an attachment unit interface (AUI) 18 and a medium access unit (MAU) 20. A bridge 22 couples the first subnetwork 12 to the second subnetwork 14 through AUIs 18 and MAUs 20. The attachment unit interface 18 is essentially a connecting cable. The medium access units 20 are shown as dedicated external units. Those skilled in the art will appreciate that in accordance with the teachings of the present invention, the MAUs may be dedicated internal units as discussed more fully below.

The MAUs ensure that the nodes communicate with the network 10 in accordance with an interface standard. The MAU transmits data onto the network media in accordance with Section 8.3 of the IEEE 802.3 standard. (See "Information Processing systems—Local Area Network"; *International Standard* 802.3; Sep. 21, 1990 Second Edition, section 8.3.) The MAU receives data from the media and translates it to the LAN controller according to section 7.4 of the 802.3 standard. In addition, the MAU detects collisions on the media.

As mentioned above, the widely implemented IEEE standard requires that the MAU be electrically isolated from the LAN controller (not shown). In addition, the MAU must be selectively enabled to prevent undesirable contention between signal pairs from the AUI converter and the internal MAU.

Figure 2:
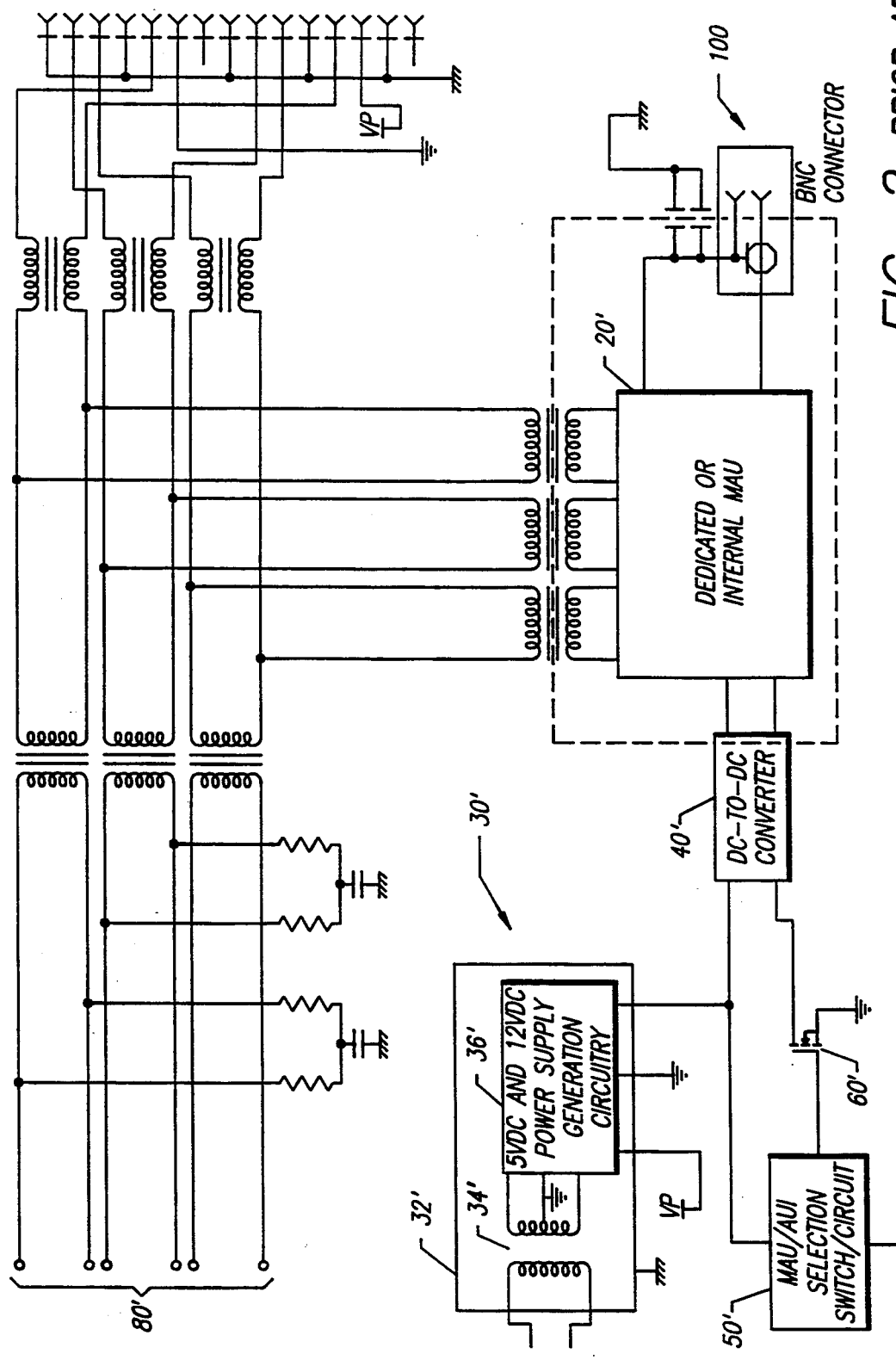
FIG. 2 is a schematic diagram of a conventional LAN interface selection and isolation circuit.

FIG. 2 is a schematic diagram of a conventional LAN interface selection and isolation circuit 30'. The selection circuit 30' includes a power supply 32' having a power transformer 34'. The primary winding of the power transformer 34' is connected to house current and the secondary winding is connected to a 5 volt power supply circuit 36'. The 5 volt output of the power supply 32' is used to power a DC to DC converter 40'. When enabled by a control signal from a MAU/AUI selection switch circuit 50', the DC to DC converter 40' provides a 9 volt supply voltage to a dedicated or internal MAU circuit 20'. The switch circuit 50' is typically a register which provides four software control of the MAU 20'. The DC-to-DC converter requires a large amount of power. This power can not directly be supplied by the enabling register 50. An intermediate power switch or FET, 60' which is controlled by the register 50, directly supplies the large power necessary to drive the converter. The Mau 20' converts data present on one of the differential signal pairs 80' to an 802.3, section 8.3.1.3,4, compatible output signal which is made available to the network media via the BNC port connector 100'. The Mau 20' also receives data from and detects collisions on the Network media via the BNC port connector 100'. The Mau converts the received data and collision detect data, in accordance with section 7.4 of the IEEE 802.3 standard, to differential, AUI compatible signals which are then driven onto the two other differential pairs 80'.

As mentioned above, DC to DC converters are costly, unreliable, consume much power and occupy much space on the printed circuit board of the system and introduce undesirable radio frequency and electrical noise. The present invention provides an inexpensive, reliable, low power, small, low noise alternative to conventional DC to DC converter based selection circuits.

Figure 3:
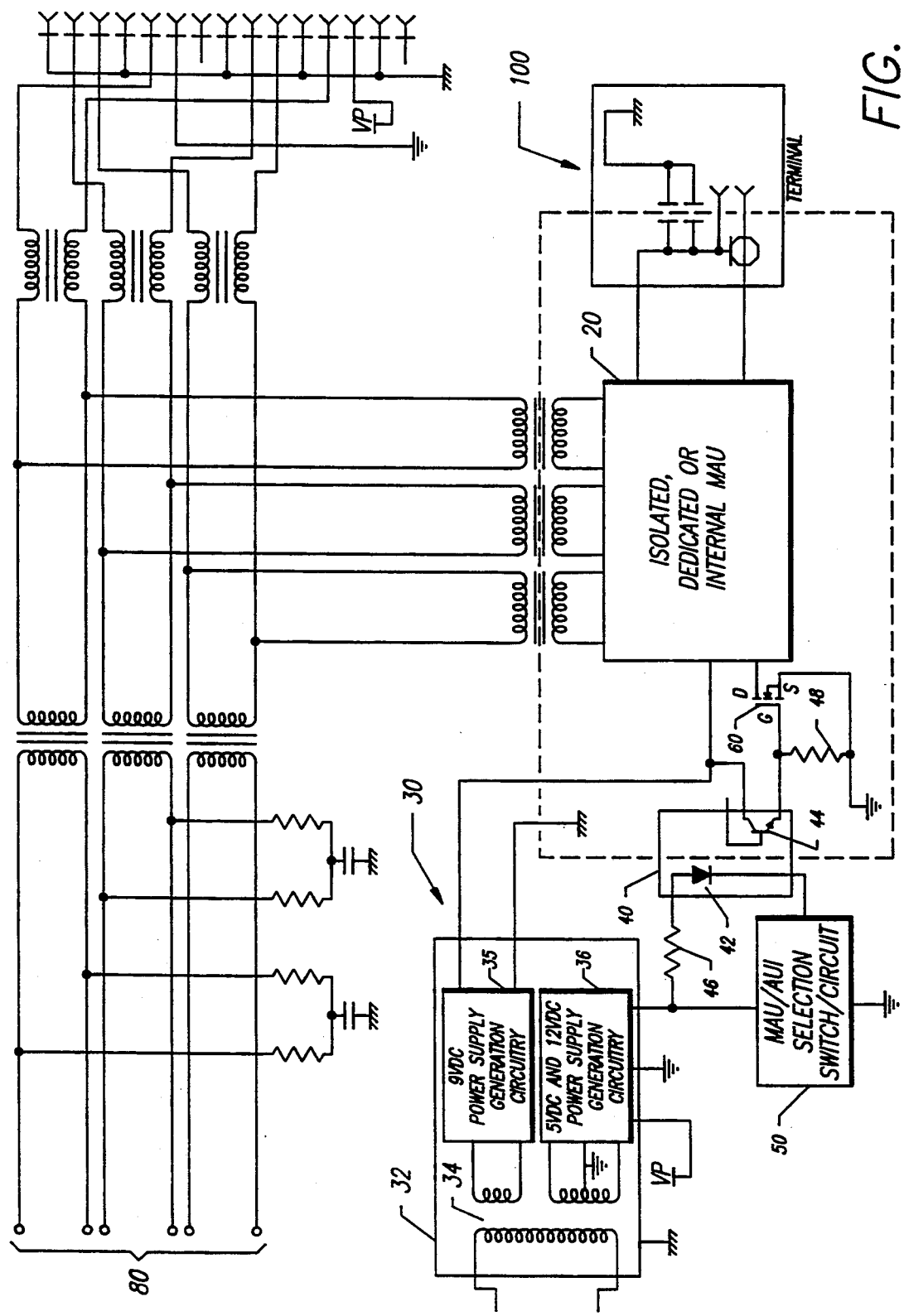
FIG. 3 is a schematic diagram of a LAN interface selection and isolation circuit designed in accordance with the present teachings.

FIG. 3 is a schematic diagram of a improved LAN interface selection and isolation circuit 30 designed in accordance with the present teachings. The improved selection circuit 30 includes a power supply 32 having a power transformer 34. The primary winding of the power transformer 34 is connected to house current and one secondary winding is connected to a 9 volt power supply circuit B5 and a second secondary winding provides power to a 5 volt power supply circuit 36. The 9 volt power supply circuit 35 may be purchased from the Delta Company of Taiwan by way of example. Thus, the power supply 32 provides isolated first and second output voltages.

In accordance with the present teachings, the 5 volt output of the power supply 32 is used to power an opto-isolator 40 such as the IL207 sold by the Siemens company. The opto-isolator 40 includes an emitter 42 (typically a photodiode) and a photodetector and transistor switch 44. A control signal provided by the MAU/AUI selection switch circuit 50 is effective to couple a 5 volt signal, from the 5 volt supply circuit 36, to the emitter 42 of the opto-isolator 40 via a resistor 46. The resistor 46 serves to limit and control the current through the photodiode. The switch circuit 50 is typically a register which provides for firmware control of the MAU 20 as in the conventional case.

On the application of the control signal by the switch 50, the emitter 42 of the opto-isolator 40 provides an optical signal which is received by the detector 44. The collector end of the detector 44 of the opto-isolator 40 is connected to a first terminal of the isolated 9 volt supply circuit 35. The second terminal of the isolated 9 volt supply circuit 35 is connected to an isolated ground. The emitter end of the detector 44 of the opto-isolator 40 is connected to the gate of an FET transistor 60. A resistor 48 is connected between the gate and source of the FET 60. The source terminal of the FET transistor 60 is connected to isolated ground. The first output terminal of the isolated 9 volt supply and the drain terminal of the FET 60 provide switched isolated power connections to the MAU 20.

The Mau 20 converts data present on one of the differential signal pairs 80 to an 802.3, section 8.3.1.3,4, compatible output signal which is made available to the network media via the BNC port connector 100. The Mau 20 also receives data from and detects collisions on the Network media via the BNC port connector 100. The Mau converts the received data and collision detect data, in accordance with section 7.4 of the IEEE 802.3 standard, to differential, AUI compatible signals which are then driven onto the two other differential pairs 80 (see 802.3, section 8.3.1.3/4 of the above-referenced IEEE Standard).

Figure 4:
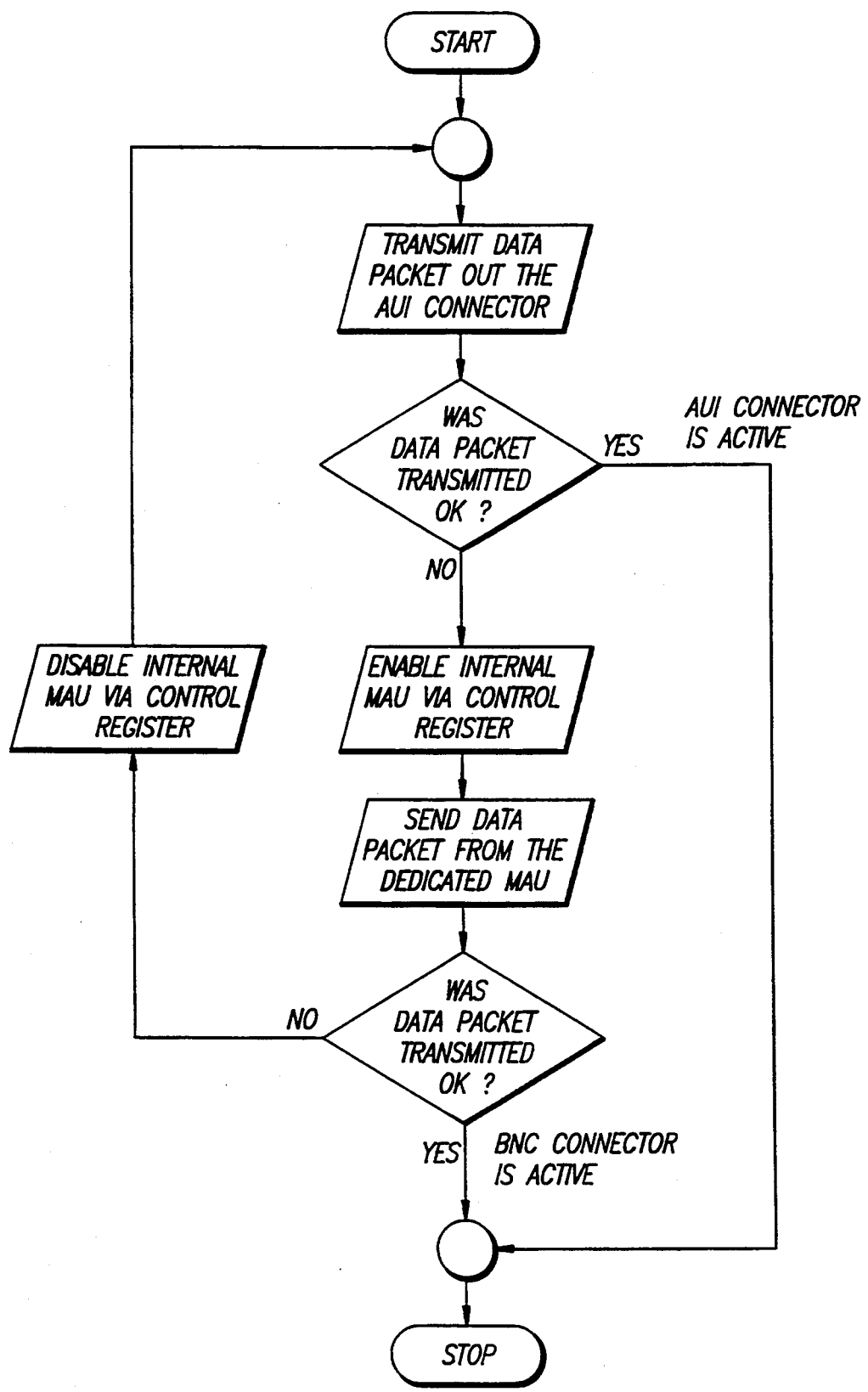
FIG. 4 is a flow chart illustrative of the operation of the improved interface selection circuit of the present invention.

Upon initialization, as illustrated in the flow chart of FIG. 4, the LAN controller initiates data communication from an AUI connector, for example, and waits for confirmation of receipt of same. AUI stands for attachment unit interface. If the packet is received, the port is considered active and the operation is terminated. If, however, confirmation is not received, the internal MAU is enabled by writing a control word to the register switch 50. This activates the opto-isolator 40 which supplies 9 volt power to the MAU 20 from the 9 volt supply circuit 35 via the FET transistor 60. When applied to the MAU 20, the 9 volt power is effective to enable the MAU. When enabled, the MAU 20 connects to the coaxial media via a BNC connector port 100. The data packet is transmitted again. If confirmation is received, the operation is terminated. If confirmation is not received, the internal MAU is deactivated by removal of the control word from the register switch 50 and the system returns to START as indicated in FIG. 4.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A circuit for coupling power to a load from a power supply, said circuit comprising:
    first means for providing a control signal wherein said first means is an interface selection switch circuit;
    an optical emitter coupled to said first means for generating an optical output signal in response to said control signal;
    an optical detector for receiving said optical output signal and generating an electrical activation signal in response thereto; and
    a power switch coupled to said optical detector for coupling power from said power supply to said load in response to said activation signal wherein said load is an interface.

2. The invention of claim 1 wherein said optical emitter and said optical detector comprise an opto-isolator.

3. The invention of claim 2 wherein said power switch is a field effect transistor.

4. The invention of claim 3 wherein said power supply is connected to a first power input terminal of said interface and to a first output terminal of said opto-isolator.

5. The invention of claim 4 wherein a second output terminal of said opto-isolator is connected to a gate terminal of said field effect transistor.

6. The invention of claim 5 wherein a drain terminal of said field effect transistor is connected to said a second power input terminal of said interface.

7. The invention of claim 6 wherein a source terminal of said field effect transistor is connected to ground.

* * * * *